(12) United States Patent
Hart

(10) Patent No.: US 6,983,295 B1
(45) Date of Patent: Jan. 3, 2006

(54) SYSTEM AND METHOD FOR DATABASE RECOVERY USING A MIRRORED SNAPSHOT OF AN ONLINE DATABASE

(75) Inventor: Donald Ralph Hart, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 456 days.

(21) Appl. No.: 10/280,717

(22) Filed: Oct. 24, 2002

(51) Int. Cl.
*G06F 17/30* (2006.01)
*G06F 12/00* (2006.01)
(52) U.S. Cl. ...................... 707/204; 707/200
(58) Field of Classification Search ............... 707/204, 707/200
See application file for complete search history.

(56) References Cited

U.S. PATENT DOCUMENTS

| 5,913,160 | A | * | 6/1999 | Leung ..................... 455/403 |
| 6,065,018 | A | * | 5/2000 | Beier et al. ................ 707/202 |
| 6,247,023 | B1 | | 6/2001 | Hsiao et al. ............... 707/202 |
| 6,377,959 | B1 | | 4/2002 | Carlson ..................... 707/202 |
| 6,785,696 | B2 | * | 8/2004 | Mosher et al. ............. 707/204 |

OTHER PUBLICATIONS

Oracle8i Data Guard, OracleÒ1, Jan. 2001.*
Oracle Backup & Recovery Handbook, Rama Velpuri, Oracle ExpressÔ, Osborne McGraw-Hill, 1995.*

* cited by examiner

*Primary Examiner*—Mohammad Ali
*Assistant Examiner*—Kuen S. Lu
(74) *Attorney, Agent, or Firm*—Alfred W. Kozak; Mark T. Starr; Lise A. Rode

(57) ABSTRACT

A rapid database recovery program uses an auxiliary database means (D2) mirrored to replicate a primary active database means (D1). A utility and recovery program utilizes the primary audit file (A1) to update the auxiliary database (D2) to make it immediately available for transaction operations.

3 Claims, 4 Drawing Sheets

REBUILDINFO FILE

SYSTEM AND METHOD FOR DATABASE RECOVERY USING A MIRRORED SNAPSHOT OF AN ONLINE DATABASE

CROSS-REFERENCES TO RELATED APPLICATIONS

This application is related to issued patents indicated below and which are incorporated herein by reference:

U.S. Pat. No. 6,044,444, entitled "Remote Data Mirroring Having Preselection Of Automatic Recovery Or Intervention Required When A Disruption Is Detected".

U.S. Ser. No. 09/951,996, entitled "Method of Capturing a Physically Consistent Mirrored Snapshot of An Online Database" which issued as U.S. Pat. No. 6,877,016.

FIELD OF THE INVENTION

The present invention relates to a particular system and method for recovery of a database by capturing a mirrored snapshot of an online database, which provides a much faster method of loading the mirrored snapshot onto another database before applying audit images to update it.

BACKGROUND OF THE INVENTION

One prior art method to which the method of the present invention generally relates is described in U.S. Pat. No. 6,065,018, entitled "Synchronizing Recovery Log Having Time Stamp To A Remote Site For Disaster Recovery Of A Primary Database Having Related Hierarchial And Relational Databases". This prior art method is a method and apparatus to synchronize recovery logs transmitted to a remote site for recovering related databases having different logical structuring. In one embodiment, the related databases are a hierarchial structured database such as IMS and a relational structured database such as DB2.

The present invention differs from the above prior cited art in that the present invention focuses on a REBUILD recovery process as a method that moves an entire auxiliary database forward in time by (1) loading the entire database from a set of dump tapes or from a mirrored snapshot of an existing database, and (2) applying audit trail images to bring the auxiliary database forward in time. The prior art involves a method that is loosely similar to the REBUILD recovery process, but the present invention provides a solution to the shortcomings of loading the entire database from one or more sets of dump tapes which takes inordinate amounts of time.

Yet another prior art method to which the method of the present invention generally relates is described in U.S. Pat. No. 6,377,959, entitled "Redundant Database Recovery Through Concurrent Update And Copy Procedures". This prior art method is a transaction processing system that continues to process incoming transactions during the failure and recovery of either of two duplicate databases. One of the two duplicate databases is assigned "active" status and the other is maintained with "redundant" status. All incoming queries are sent only to the active database and all incoming updates are sent to both active and redundant databases. When one database fails, the other is immediately reassigned active status if not already active and continues to process incoming queries and updates during the failure. When the failed database is repaired and restarted, all records are flushed therefrom and the failed database is reconstructed using interleaved copy and update operations in a single pass through the active database. Incoming transaction and copy operations are interleaved according to a queue thresholding method for throttling copy operations responsive to increased numbers of incoming transactions. The transaction processing system remains operational both during the failure and during the recovery activities and reaches full recovery without downtime.

The present invention differs from the above prior cited art in that the present invention focuses on methods relating to a specialized form of recovery: a REBUILD recovery. The method of the present invention relates to a backup source that is required for a REBUILD recovery, while an online database recovery process such as that described by the prior art method utilizes no such backup mechanism. The method of the prior art teaches only methods relating to online database recovery.

Yet another prior art method to which the method of the present invention generally relates is described in U.S. Pat. No. 6,247,023, entitled "Method For Providing Database Recovery Across Multiple Nodes". This prior art method is a three-phase database crash recovery mechanism and detailed including a forward phase, a backward phase, and a third, so-called "sideward" phase for recovery of transactions which were interrupted at the time of the crash, using Global Transaction IDs to track the status of the transactions at the coordinating and at the participating nodes. Depending upon the status of the transaction at the time of the crash, either a query message to the coordinating node or a vote message to the participating nodes is generated and processed, thereby allowing most interrupted transactions to be completed. Additional implementations are provided for crash recovery, without duplication of efforts, across multiple nodes in a parallel database environment, for cascaded transactions wherein the database recovery at a local node is triggered by database recovery at a remote node in the parallel system, and for concurrent recovery, wherein database recovery is started concurrently at both transaction coordinator and participant nodes.

The present invention differs from the above prior cited art in that the prior art invention focuses on a "database crash recovery mechanism" that is similar to the recovery mechanism described in U.S. Pat. No. 6,377,959 in that it teaches methods relating to online database recovery. The method of the present invention, however, relates to a backup source that is required for a REBUILD recovery, while an online database recovery process such as that described by the prior art method, utilizes no such backup mechanism.

SUMMARY OF THE INVENTION

It is therefore an object of the present invention to provide a much faster method of loading the entire auxiliary database before applying audit images.

Still another object of the present invention is to provide a recovery method that can be measured in minutes.

Still another object of the present invention is to contain a REBUILD recovery process that moves an entire database forward in time.

Still another object of the present invention is to load the entire database by bringing online all physical disks that comprise a mirrored snapshot.

Still another object of the present invention is to create a database utility program that issues a REBUILD command specifying, "QUIESCE DB" as the <recovery source>.

Still another object of the present invention is to have said utility program perform a complete database residency verification. Therefore, for each file listed in the control file, a check of disk storage is performed for file residency.

Still another object of the present invention is to create a REBUILDINFO file, which stores the QUIESCE TIME STAMP of the mirrored database snapshot, in which the QUIESCE TIME STAMP designates the point to begin audit application.

Still another object of the present invention is to create a database utility program that applies audit trail images to bring the database forward to a logical point in time.

The present method provides a rapid recovery during failure of a primary active database by an auxiliary database, which is a mirrored QUIESCE copy from the primary active database. Upon failure of the primary active database, a utility program will read audit data to update said auxiliary database via a REBUILD recovery program in a rapid fashion to allow the auxiliary database to immediately make access available to concurrent users.

Still other objects, features and advantages of the present invention will become readily apparent to those skilled in the art from the following detailed description, wherein is shown and described by the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

Figure 1:
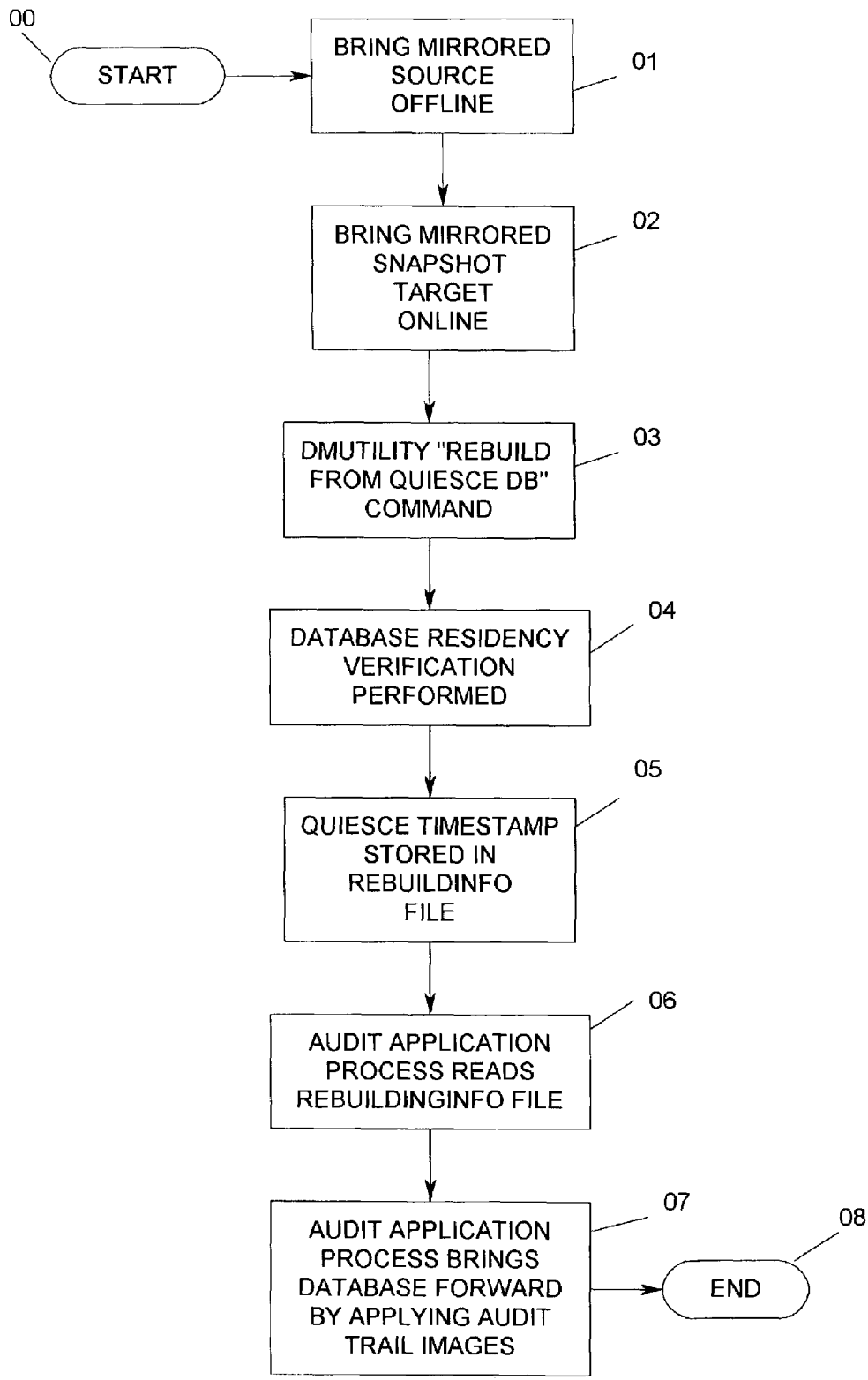
FIG. 1 is a flowchart showing the steps involved to perform an auxiliary database REBUILD recovery using a mirrored snapshot of an online database.

Glossary Items:

1. ACCESSROUTINES (ACR): The software component of DMSII product that is primarily responsible for the accessing (creating, modifying and deleting) of data in a DMSII database. The Accessroutines is also responsible for auditing all changes to the database.

2. ACR: See Accessroutines.

3. ACTIVE TRANSACTIONS COMPLETED: See QUIET POINT.

4. ADMINISTRATIVE OPTIONS: In an RDB system, user-interface options that initiate administrative tasks.

5. APPLICATION DEVELOPMENT: The activity of writing and testing database applications.

6. APPLICATION TRANSACTION STATE: The condition every update program of an audited database must enter in order to perform any data record update statements (e.g., STORE, DELETE, etc.).

7. AUDIT APPLICATION PROCESS: A database recovery process that reads data changes from the audit trail and makes the corresponding changes to the database.

8. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).

9. AUDIT BUFFER: A system memory buffer maintained by the DMSII software into which an audit block is placed for ACCESSROUTINES access.

10. AUDIT FILE: Logically considered to be the sequential storage of Audit Records. Actually, the sequential storage of Audit Blocks which contain the Audit Records.

11. AUDIT RECORD: A structured package of data built somewhere within the ACR and stored (sequentially) into the Audit File. Header and trailer words of the record contain, among other things, the length and type of record.

12. AUDIT SECTION: With the Extended Edition, multiple MCP disk files can be used to physically implement a single Audit File. Each of these disk files is referred to as a Section of the Audit File. The sequence of Audit Blocks is spread, round robin fashion, among the multiple Audit Sections.

13. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN value, although they each have a unique section number within their Audit File.

14. AUDIT TRANSFER: In an RDB system (Remote Database Backup), a method of transmitting audit images from the source host to the target host.

15. AUDITED CONTROL POINTS: See CONTROL POINTS.

16. BACKUP: A copy of the database files stored on magnetic tape or disk storage.

17. BACKUP SOURCE FOR REBUILD RECOVERY: A complete database backup; typically this is a set of dump tapes.

18. BCV: EMC provides the ability to create a duplicate of a disk, which can then be processed independently of the original disk. The duplicate is called a Business Continuation Volume (BCV). A BCV contains a mirror image of an active production volume. The BCV can be separated from the production volume, allowing separate tasks to operate on independent data images.

19. BI: Business Initiative.

20. BNA NETWORK: The network architecture used on ClearPath Enterprise Servers to connect multiple, independent, compatible computer systems into a network for distributed processing and resource sharing.

21. CERTIFICATION: The process of verifying the physical consistency of a database or portion of a database.

22. CONFIGURATION OPTIONS: In an RDB system, user-interface options that initiate configuration tasks.

23. CONTROL POINT: A logical construct within the e-@ction Enterprise Database Server used to limit the number of audit records which must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC points.

24. CSC: Customer Support Center. The Unisys organization tasked with answering customer questions and problem resolution. CSC is the first line of support for customers after consultation with any on-site representatives.

25. DASDL: Data And Structure Definition Language. The language used to specify the structure and specific software configuration for a database.

26. DATABASE ANALYSIS: The process of analyzing the physical structure of database files.

27. DATABASE AVAILABILITY: The availability of data files within a database system.

28. DATABASE CONTROL FILE: A special file required by the DMSII software on all databases. System-level information is stored in the control file, which the ACCESSROUTINES use to manage the database. The control file also provides a place for exclusive users of the database, such as DMUTILITY to mark the database as unavailable.

29. DATABASE EXTRACTIONS: Data that is read from a database.

30. DATABASE INTEGRITY TESTING: The process of testing the physical consistency of data files within a database.

31. DATABASE PROCESSING: Database processing in a mirrored disk environment.

32. DATABASE RESIDENCY: A state of the database when all files are resident (locatable on disk).

33. DATABUFFER: A system memory buffer maintained by the DMSII software into which a data block is placed for ACCESSROUTINES access.

34. DATA SET: A disk file (potentially, a group of disk files) containing data records all in a similar format. An e-@ction Enterprise Database Server structure type declared in DASDL.

35. DATA WAREHOUSING: A copy of data specifically structured for querying and reporting.

36. DBA: DataBase Administrator. The person within an organization who is responsible for the development, maintenance, and security of databases.

37. DISASTER RECOVERY: The recovery of any event that creates an inability for an organization to provide critical business functions for some predetermined period of time.

38. DISK ROW: The minimum allocation of disk space via the MCP. A disk file is composed of a sequence of disk rows that may occupy arbitrary locations on the disk media. Within a disk row, all blocks are allocated at sequential disk addresses.

39. DMRECOVERY: A database system process that applies audit images to a database by reading data changes from the audit trail and making the corresponding changes to the database.

40. DMSII: Unisys Data Management System II. The comprehensive, primary database management software package in use on Unisys A Series family of mainframe computers.

41. DM UTILITY COMMANDS: Commands used to manage a physical database. These are described in a Unisys Corporation Publication, 8600-0759-606 (November 2001) entitled "Unisys e-@ction Enterprise Database Server For ClearPath MCP Utilities Operations Guide".

42. DUMP TAPES: A traditional form of database backup resides on a set of Dump Tapes.

43. EMC: A global enterprise storage company.

44. EMC SRDF: See SYMMETRIX REMOTE DATA FACILITY.

45. EMC TIMEFINDER: A business continuance solution which allows customers to use special devices that contain a copy of Symmetrix devices from an attached host(s) while the standard Symmetrix devices are on-line for regular I/O operation from their host(s).

46. FLUSHING TO DISK: The process of writing system memory buffers (data and/or audit) to disk.

47. FUTURE TRANSACTIONS SUSPENDED: The process of preventing database applications from entering a transaction state.

48. HMP: Heterogeneous Multi-Processor.

49. INTEGRATION TEST: The act of combining individual units and components, and then testing them to ensure that the individual units and components still function as expected.

50. LOGICALLY CONSISTENT DATABASE: An online database whose consistency is maintained by data buffers and physical data files.

51. MARC: Menu Assisted Resource Control. A menu-based interface to Unisys A Series systems for the purpose of entering system commands.

52. MCP/AS: Unisys Master Control Program/Advanced Systems. The comprehensive virtual memory operating system which drives the Unisys A Series family of hardware.

53. MCP ENTERPRISE SERVER REMOTE DATABASE: In an RDB system, the database copy that resides at the remote host.

54. MCP TO RDB DATABASE OPERATIONS CENTER GUI: The complete set of Remote Database Backup Operations (Configuration, Administrative, and Monitoring) contained within the Database Operations Center graphical user interface.

55. MIRROR FAMILY: One or more physical disks that share a family name and contain mirrored images of all data from a source family of disks.

56. MIRRORED AUDIT TRANSFER: In an RDB system, a method of audit transfer where target audit data is available on a mirrored family of disks.

57. MIRRORED COPY: See MIRROR FAMILY.

58. MIRRORED DATA TRANSFER: A method of maintaining a mirrored family of disks containing data files.

59. MIRRORED DISK: A disk which is a mirror image of its source disk (e.g. Family Name, Serial number and capacity are identical).

60. MIRRORED SNAPSHOT: A mirrored copy that is split from its source.

61. MONITORING OPTIONS: In an RDB system, user interface options that initiate the monitoring of audit generation and audit transfer activities.

62. OFFLINE DATABASE SYSTEM: A database system that is in a state of inactivity whereby no data files are being accessed.

63. OFFLOAD PROCESSING: The process of dividing database access activities by creating one or more copies of a database.

64. ONLINE IN DATABASE SYSTEM: A database system that is in a state of activity whereby data files are being accessed and/or modified.

65. On Line Database Recovery Process: A recovery process that is initiated after a database system or system failure in which audit images are applied to restore physical and logical consistency of a database without having to restore the database from a Backup Source.

66. PDS: Product Definition System: The Unisys internal system containing ordering and configuration information for all Unisys products.

67. PHYSICALLY CONSISTENT DATABASE: A database whose consistency is established when no applications are in a transaction state and all data buffers are flushed to disk.

68. POINT-IN-TIME SNAPSHOT: A mirrored snapshot that is split at a specific point in time.

69. QUIESCE DATABASE: A database that is in a physically consistent state, i.e., all data buffers are flushed to disk.

70. QUIET POINT: Location in the Audit trail where no program is in transaction state.

71. RDB: Remote Database Backup. A Unisys product which provides real-time backup services for DMSII database as part of a disaster recovery plan. Remote Database Backup is suitable for use with A Series Databases.

72. REAL TIME REMOTE DATABASE ACCESS: Access to a remote database copy while the copy is kept current with its source.

73. REBUILD INFO FILE: A file that is created by the DMUTILTIY process.

74. REGRESSION TEST: A representative subset of functionality tests to ensure stability and accuracy following the insertion or modification of code.

75. REMOTE COPY AUDIT: The activity of backing up a remote audit file that is a copy of its source.

76. SAN: Storage Area Network.

77. SAN MIRROR DISK MANAGER: A Unisys Corporation ClearPath system software feature that makes it possible to split off a copy of a disk family within the same MCP environment as the source volumes, regardless of the type of disk.

78. SCHEDULED BACKUP: A backup that is scheduled to be performed at a predetermined time.

79. SINGLE HOST BACKUP: A backup that occurs at the same host as its database source.

80. SNAPSHOT COPY: The term "snapshot copy" is used to identify a copy of an MCP family which has been provided unique identification. This allows the "snapshot copy" to coexist within the same MCP environment as its original.

81. SOURCE COPY: In a mirrored database environment, the database copy that is mirrored to a target.

82. SPLIT MIRRORS: Target mirrored disk copies that are split from their original (source).

83. SSR: System Software Release. A package of system software and related documentation that is periodically released to the field for A Series computer systems.

84. STORE SAFE: A storage software feature that enables a site to ensure that multiple copies (mirrors) of disk data are coherent.

85. STORE SAFE MEMBER: A member of a mirrored set that has been assigned a store safe name.

86. SYMMETRIX: EMC corporation's enterprise storage system.

87. SYMMETRIX I: In an SRDF environment, the disk storage subsystem that represents the source.

88. SYMMETRIX II: In an SRDF environment, the disk storage subsystem that represents the target.

89. SYMMETRIX REMOTE DATA FACILITY (SRDF): EMC's disk-mirroring software solution for use with Symmetrix hardware.

90. SYNC POINT: A quiet point (in the audit trail) that is forced to occur every "n" transactions; Audit buffers are flushed.

91. TRACKER: An asynchronous RDB task declared and processed from Accessroutines. Its function is to rebuild the database.

92. UCF: User Communication Form. A form used by Unisys customer to report problems and express comments about Unisys products to support organizations.

93. VDBS: Visible DataBase Stack. A set of commands which are issued directly to a database stack to interrogate or change some aspect of the database configuration.

87. AUDIT DATA: For DMSII databases, data that records every change to a predefined database.

88. PARTITIONED AUDIT FILE: For DMSII databases, a logical audit file that is partitioned into a predefined number of physical files.

89. AUDIT FILE: For DMSII databases, a file produced by the Accessroutines that contains various control information, including before and after images of records resulting from changes to the database.

90. SOURCE DATABASE HOST: In an RDB system, the host that contains the primary copy of the database.

91. RESYNCHRONIZATION MODE: Under the ABW audit file transmission mode of an RDB database, the process of bringing the audit trail of the secondary database back into the closest possible synchronization with the audit trail of the primary database.

92. TARGET HOST: In an RDB system, the host that contains the remote copy of the database.

93. REMOTE DATABASE BACKUP: A disaster recovery capability for DMSII-based databases that enables the replication of an audited (primary) database on a secondary host. The replicated (secondary) database is kept up-to-date with the primary database through the application of audits from the primary database. When the primary database becomes unavailable, the secondary database can take over the role of the primary database.

94. LOGICAL AUDIT BLOCK: For DMSII databases, a structured package containing potentially many Audit Records (in the extreme situation, it is also possible that a single Audit Block could only contain a partial Audit Record).

95. LOGICAL AUDIT FILE: For DMSII databases, the sequential storage of Audit Blocks that contain Audit Records. One Logical Audit File may contain 1 or more Physical Audit Files (Sections or Partitions). The sequence of Audit Blocks is spread, round robin fashion, among the Audit Sections.

96. PHYSICAL AUDIT FILE: A physical file containing Audit Blocks. May be 1 of many sections of a Logical Audit File.

97. PORT FILE NETWORK COMMUNICATION: In an RDB system, the method of messaging and data transfer between a source database system and a remote backup system.

98. REMOTE HOST: In an RDB system, the host that contains the duplicate copy of the source database. Also known as the Secondary Host.

99. SYNCHRONIZATION OF THE AUDIT TRAILS: In an RDB system, the process of keeping the audit trail at the remote host synchronized with the audit trail at the source host.

100. FASTER AUDIT GENERATION: For DMSII databases, a rate of audit generation that can be achieved by using sectioned audit and multiple processors.

101. ORIGINAL AUDIT TRAIL: In an RDB system, the audit trail of the source database.

102. NON-PARTITIONED AUDIT FILE: In a DMSII system, and audit file that has 1 section or partition. Equally, an audit file that contains one physical file.

103. LOGICAL RESYNCHRONIZATION PROCESS (CATCHUP): In an RDB system, the mode of resynchronizing the primary and secondary audit trails following a network failure during normal audit transfer.

104. SHARED DATABASE TASK: For DMSII databases, the running process accessed by all database applications to read and write data to the database and audit trail.

105. CATCHUP TASK: In an RDB system, a physical process that runs at a remote host, reads audit data from a port file connected to a source database, and writes the data to a physical audit file section.

106. SERVER TASK: In an RDB system, a task that is connected to a remote host for messaging and data transfer.

107. RDBSUPPORT LIBRARY: In an RDB system, the library that is accessed by the shared database task, database utilities, and additional applications responsible for configuring an RDB system. The library is also a running process responsible for initiating local and remote tasks through port file communication.

108. PARALLEL BUFFERS: Any number of storage areas each of the same size.

109. SYNCHRONIZATION OF SOURCE AUDIT TRAIL WITH REMOTE AUDIT TRAIL: Same as SYNCHRONIZATION OF THE AUDIT TRAILS.

110. NORMAL AUDIT TRANSFER: In an RDB system, the uninterrupted transfer of audit data from a source database host to a remote host while the source database is being updated.

111. SQL (STRUCTURED QUERY LANGUAGE): A standardized language for defining, querying, maintaining, and protecting the contents of a relational database.

112. SQL-DATABASE: A relational database made up of tables and views.

113. SEMANTIC INFORMATION MANAGER (SIM): A database management system that simplifies the task of modeling your application environment based on the semantic data model.

114. SIM-DATABASE: A DMSII database defined by SIM.

115. LOGIC & INFORMATION NETWORK COMPILER (LINC): A software development tool that may be used to generate a DMSII database and any number of applications to access the database.

116. LINCII DATABASE: A database generated by the LINC system software; may be a DMSII database.

117. RDB UTILITY: The menu-driven user interface for defining, installing, and maintaining an RDB system.

118. AUDIT FILE SWITCH: For DMSII databases, the logical time when one audit file is complete and a new one is started.

119. SYNCHRONIZATION (PRESENT CONTEXT): In an RDB system, the process of updating a remote audit trail to replicate the source audit trail.

120. PERIODIC SYNCHRONIZATION: In an RDB system, audit synchronization that takes place only when complete audit files become available for transfer to a remote host (i.e. following an audit file switch.)

121. SYNCHRONIZATION—NEAR REAL TIME: In an RDB system, the level of synchronization achieved when each audit block is transferred to the remote host immediately after it is written at the source host.

122. SYNCHRONIZATION—WITHIN ONE COMPLETE AUDIT FILE: In an RDB system, the level of synchronization achieved when an audit file is transferred to the remote host immediately following an audit file switch at the source host.

123. AUDIT IMAGES: For DMSII databases, structured package of data representing changes to the database that are stored sequentially into the audit trail.

124. SYNCHRONIZED AUDIT TRAILS: In an RDB system, audit trails at a source and remote host that are exact duplicates.

125. SYNCHRONIZATION LEVEL: In an RDB system, the level at which the remote audit trail is kept current as a replicate of the source audit.

126. SECTIONED AUDIT FILES: Same as PARTITIONED AUDIT FILES.

127. NON-SECTIONED AUDIT FILES: Same as NON-PARTITIONED AUDIT FILES.

128. AUDIT FILE VS. AUDIT BLOCK: For DMSII databases, the audit file represents one or more physical files that contain audit blocks that are stored sequentially.

129. TAKEOVER: In an RDB system, the process that enables the remote database to assume the role of the source database.

130. CATCHUP: In an RDB system, the process that brings the remote audit trail back into synchronization with the source audit trail following a suspension of normal audit transfer.

131. PACKET (OF AUDIT DATA): For DMSII databases, a collection of one or more audit blocks.

132. AUDIT TRAIL: For DMSII databases, the sequence of audit files that are created and span the life of the database.

133. ACR: Abbreviation for Accessroutines, the software component of the DMSII product that is primarily responsible for the accessing (creating, modifying and deleting) of data in a DMSII database and auditing all changes to the database.

134. ACR SERVER: In an RDB system, a task module that is initiated remotely at either host to communicate between hosts.

Notes:
EMC=TM of EMC Corp.
Symmetrix is a copyright of EMC.
SRDF=TM of EMC.
ClearPath=TM of Unisys.
Windows NT—Copyright of Microsoft.

GENERAL OVERVIEW:

An important part of any database system is some sort of a recovery scheme for the detection of failures and the restoration of the database to a consistent state. These systems operate on the basis of a "transaction", which is logical unit of work which references a series of queries using reads and also updates involving writes, including deletes, inserts and changes. This transforms a consistent state of a recoverable resource into another consistent state without necessarily preserving proper consistency at all intermediate points of time.

A prior art system shown in U.S. Pat. No. 5,170,480 issued to Mohan, discloses a synchronous distributed database system that provides for storing a consistent copy of a database into locations. Mohan teaches the use of a tracking system that operates with an "active" database system in order to maintain a "tracking" database in a second redundant database system, where the tracking database is a replica of the active database maintained in the active database system.

When failure occurs in the active database system of a dual database system, often a redundant database is available as a checkpoint for recovery of the active database in conjunction with using transaction log forward recovery procedures which have been used in the art. However, under these operations, neither database is available for active use during such a recovery period. Additionally, if one of the two database systems is down for a significant period of time, the size of the recovery transaction log necessary for recovering the failed database, can grow to a huge and unacceptably large size. This is so because the forward recovery log must maintain a record of all transactions occurring during the failure period which then have to be applied to the recovered consistent database in order to bring it up-to-date to a concurrent consistent state.

In another fashion, a failed database can be recovered merely by making a new copy of the redundant database following the repair of the active database system failure. Further problems arise when the redundant database is remotely located from a very large active database since the mechanics of copying the entire database over to a remote location may present very unacceptable difficulties, and further to ensure consistency, the active database must normally be locked until completion of the database copying process. Thus, all incoming transactions must be accumulated until the active database is then unlocked, and during this time the accumulation may reach a terribly unacceptable large size.

As previously stated in the objects of this invention, there is need for a dual database system that maintains two databases where the "active" database is always available during and after system failure. Such type of system must permit failure repair without interrupting system operation, and must also provide a means for recreating the failed backup database following its repair without interrupting system operation, that is to say, the "active" database must remain available for normal system queries and updates, while the auxiliary or "redundant" database is being recreated following repair of a system failure. The recreated auxiliary or "redundant" database must then reflect all the intervening updates which were made to the active database during the recovery period, thus, to arrive at a concurrent consistent state following such recovery.

Many types of problems arise in doing forward recovery, for example, if the failed database is down too long, the forward recovery log or audit trail could become too large to permit recovery of a current consistent database to be taken from the earlier checkpoint copy. Further, another problem, the incoming transactions cannot be processed during forward recovery, and as a result, must be accumulated making the necessary forward recovery log even larger. Further, if the forward recovery log is frozen, then the entire database system must be halted during forward recovery which interrupts continuous availability. The present system described herein operates to overcome these limitations.

These transactional types of data process systems normally require a large amount of data storage. These systems will generally provide backup copies of the user data to ensure against loss of data. Thus, many data processing systems utilize the practice of making backup recovery copies to provide disaster recovery. Often, a recovery copy of the customer data is kept at a remote site from the primary storage location so that if a disaster strikes the primary location, the customer data can be retrieved or recovered from the recovery copies located at some remote site.

The present invention involves a faster method of recovery of a database and for loading an entire database before applying audit images. In normal practice, a REBUILD recovery process is a method that moves an entire database forward in time by (1) loading the entire database from one or more sets of dump tapes which are only valid up to an earlier point in time, and (2) applying audit trail images for updating and to bring the database forward to now be updated. Database update activity is suspended throughout the REBUILD recovery process. One previous shortcoming of this type of method is the potential time required by step (1) which can be measured in hours to days. Unfortunately, at the same time, the process of "suspending database" activity is counter productive to the goal of maintaining 24×7×365 database update availability.

Thus, it is advantageous to have a REBUILD recovery process that moves an entire database forward in time by (1) loading the entire auxiliary database by bringing online all physical disks that comprise a mirrored snapshot, and (2) a database utility program that issues a REBUILD command specifying, "QUIESCE DB" as the <recovery source>, (3) then, wherein the utility program performs complete database residency verification, (4) a REBUILDINFO file is created, which stores the QUIESCE TIME STAMP of the mirrored database snapshot; this QUIESCE TIME STAMP designates the point to begin audit application transfers; and (5) a database utility program that applies audit trail images to bring the QUIESCED auxiliary database forward to a logical point in time.

The QUIESCING of a database is described in the referenced application, U.S. Ser. No. 09/951,996, which issued as U.S. Pat. No. 6,877,016.

DESCRIPTION OF PREFERRED EMBODIMENT

Figure 3:
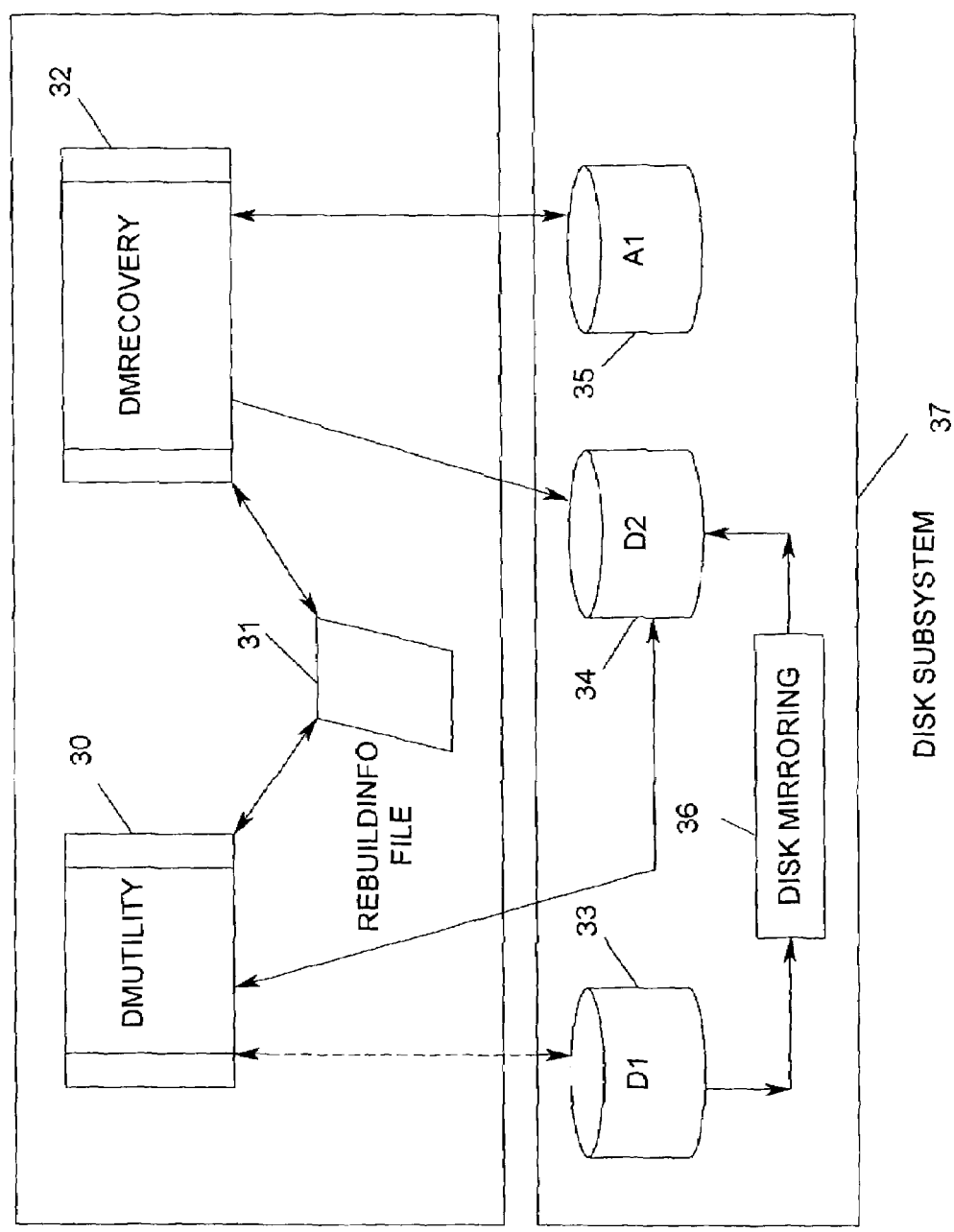
FIG. 3 is a schematic drawing showing the REBUILD recovery process and its connection to the disk subsystem.

FIG. 3 is a schematic drawing showing the REBUILD recovery process and the elements of information and programs involved. The REBUILD recovery process is a method which moves the auxiliary database (D2) forward in time, that is to say, the DUMUTILITY program 30 begins the REBUILD process by loading the entire database from one or more sets of DUMP tapes or by reading a complete database copy from (D1) that is in a state of QUIESCE. The DMRECOVERY program 32 then applies the audit trail after-images in order to bring the database (D2) forward in time. This means that at some point in time, the original database D1 was put in a state of QUIESCE, that is to say, it was suspended at a given moment, which was recorded by a Time Stamp. At the same time, this material was also physically mirrored from D1 to D2. Thus, likewise, the QUIESCED database copy D2 was also frozen at the period of time recorded by the Time Stamp. Thus, this QUIESCED database copy is no longer consistent with the ongoing present-time moment, since there are other changes which have been made to the audit disk A1. Thus, it is necessary for the material on D2 to be updated and upgraded by means of the later accumulated material in the audit tape A1, and this is what is meant by bringing the database forward in time; that is to say, the data residing at the earlier Time Stamp date during the QUIESCE period which was placed on D2 now has to be transferred and updated by means of the audit file A1 in order to bring it forward in time, or updated to the present closing moment, where another Time Stamp will state at what point the database has been updated. This material can then be placed onto the disk D2 which constitutes a recovered auxiliary database. Thus, if the original database files on disk D1 have been lost or destroyed they can still be recovered through accessing the QUIESCED database copy D2 and applying audit images from disk A1 to bring the database copy forward in time.

Thus, in "recovering the database" there occurs a "REBUILD" to [Time Point], thus, this program will apply all after-images which were created since the DUMP or the QUIESCE point (which has a Time Stamp) and then stops at the first control point record in the audit file that has a Time Stamp greater than or equal to the QUIESCE point.

A QUIESCE command for a remote database secondary host will prevent a TRACKER program from performing an audit application update until a RESUME command is executed after the QUIESCE point.

During the QUIESCE period, a mirrored copy (D2) of the physically consistent database can be split-off from its source copy (D1) in order to off-load database activities for accomplishment, such as backup, certification, and data warehousing. Furthermore, database availability is now increased as the primary database system remains on-line throughout the entire process. Since the QUIESCE operation is allowed at an RDB secondary auxiliary disk, this would allow recognition of a QUIESCED database copy, as a valid backup source. This is significant in the amount of time that is saved compared to loading a traditional database backup from a dump tape or disk.

A DMUTILITY command 30 in FIG. 3 communicates directly with a REBUILDINFO file 31, which it has created. The function of the REBUILDINFO file 31 serves as input to a DMRECOVERY program 32. The contents of the REBUILDINFO file 31 hold information regarding which portion of the database needs to be recovered and the logical stopping point of the recovery (e.g. 12 midnight Dec. 31st, 2001). Also stored in this file 31 is the logical starting point of the audit application phase of the REBUILD recovery (QUIESCETIMESTAMP). The DMRECOVERY process will scan the audit trail 35 (A1) backwards until the starting point is found, and begin audit application at that point. The DMUTILITY 30 also communicates information back and forth with the data files at disk 34 (D2). The DMRECOVERY 32 then communicates with audit files at disk 35, A1, and applies audit images to D2.

A disk subsystem 37, FIG. 3, contains the disk mirroring system 36. The data files communicating with the DMRECOVERY 32 and are passed via the disk mirroring system 36, and stored into the disk 34, a newly configured D2, thus providing a potential recovered database D2. If the disk D1 goes offline, the communication link between the DMUTILITY 30 gets disconnected (dashed line), and the mirrored copy in disk D2 now communicates with the DMUTILITY 30 and also receives the DMRECOVERY information 32.

FIG. 1 is a flowchart showing the steps involved to perform a database REBUILD recovery using a mirrored snapshot D2 of an online database D1. This begins with a start bubble 00, and is followed by a process to bring the mirrored snapshot source offline, which means it has been flushed and is no longer present (Block 01). Next, a process to bring mirrored snapshot target disks D2 (FIG. 2) online with an OS (Operating System) command is initiated (Block 02). A disk is considered "online" if it is accessible to the system if the other disk breaks down, and if the correct name is given to the disk. Next, a DMUTILITY "REBUILD from QUIESCE DB" command is initiated (Block 03).

The operation of "REBUILD from QUIESCE DB" operates as follows. A QUIESCEd database copy (D2) is recognized by a DMSII database system as a complete valid database source to begin audit application. The procedures required to create a QUIESCE database copy are documented in the Unisys e-@ction Enterprise Database Server For ClearPath MCP Utilities Operations Guide, published 11/2000 by Unisys Corporation, Document 8600-0769. The verification of the database copy (D2) is then performed by the program designated DMUTILITY. The DMRECOVERY process performs the audit application work. A QUIESCE database copy (D2) is recognized during a "recovery" operation by the Data Management System DMSII, as a complete valid database source to begin audit application at a remote or a local site. The Recovery process performs the audit application update regulated by recognizing a stopping point that is configurable with the DMUTILITY syntax.

The physical mirroring of a data disk used to create a QUIESCE database copy is an external activity to the Data Management System DMSII. All physical disks that comprise a QUIESCE database copy must be brought online via MCP operational commands in the same manner that existing physical disks are brought online.

A database residency verification is then performed at block 04 to indicate that all data files that comprise the database are resident on disk D2, which mirrors Disk D1. This is accompanied by a QUIESCE Time Stamp stored in the REBUILDINFO file (Block 05).

REBUILD is a method which moves the entire database (D2) forward in time. The program DMUTILITY begins the REBUILD process by loading the entire database from one or more sets of DUMP tapes or by reading a complete database copy that is in a state of QUIESCE. DMRECOVERY then applies the audit trail after-images, in order to bring the database (D2) forward in time. The recovery applies the after-images from all the audit files which were created since the "time of the DUMP", or the "time of the QUIESCE". After all the after-images created since the DUMP or the QUIESCE point, then there will be a stop at the first control point record in the audit file having a Time Stamp greater than or equal to the specified Time Stamp of the QUIESCE point.

Then, an audit application process reads the REBUILDINFO file (FIG. 4) at block 06, and is followed by an audit application process, which brings the database at D2 forward time-wise by applying audit trail images at block 07. The audit application process is a database recovery process that reads data changes from the audit trail and makes updating changes to the database (D2). The process then ends at bubble 08.

Figure 2:
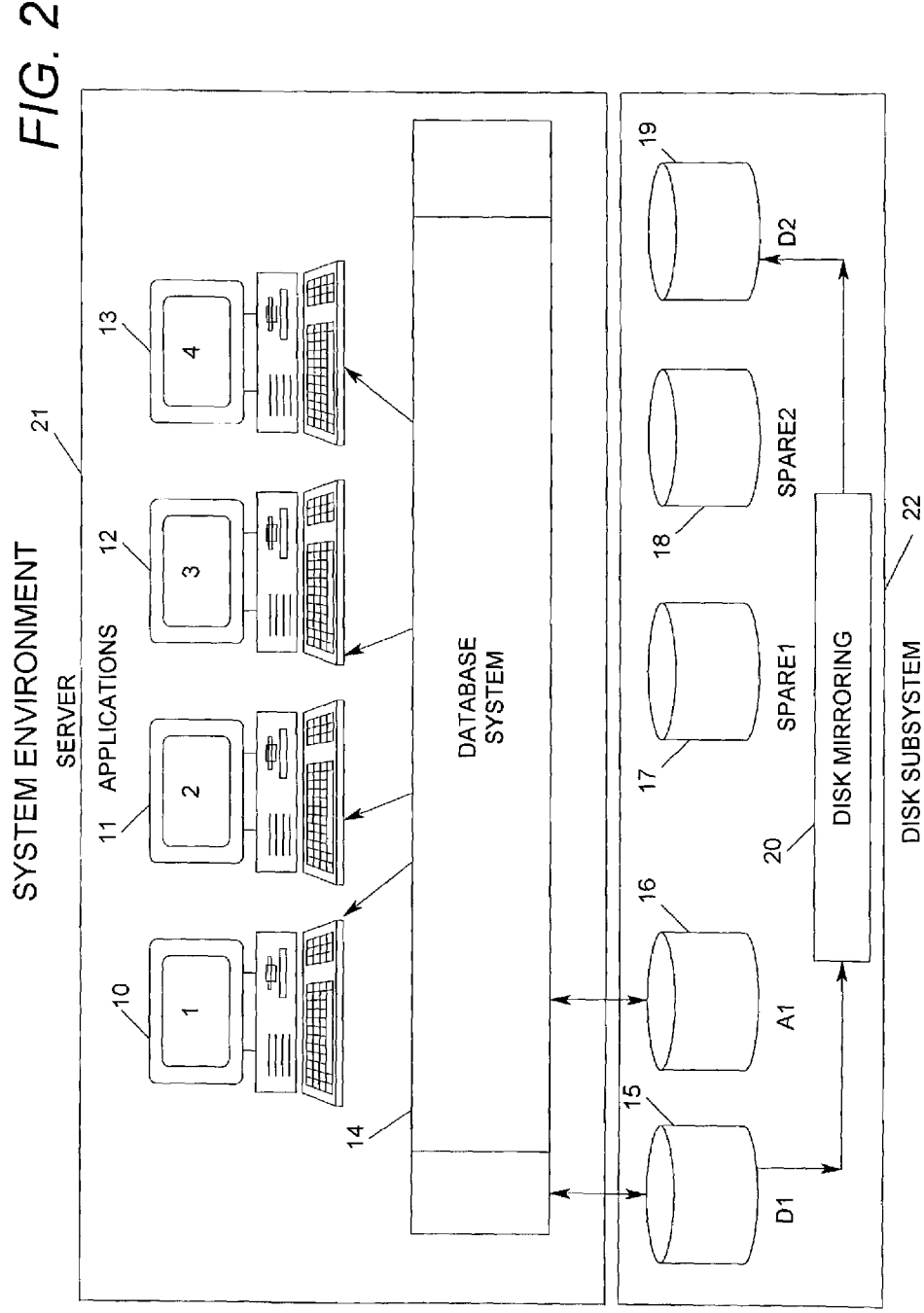
FIG. 2 is a drawing of the operating system environment showing a server connected to a disk subsystem having primary auxiliary disks and the types of information held therein.

FIG. 2 is a drawing showing the system environment of a method and system for database recovery using a mirrored snapshot of an online database. One single main server 21 is shown, which is used to run several different applications and utilizes the personal computer client-users 10, 11, 12, and 13, which interact with and access the primary database system 14.

Within the disk subsystem 22, the data files contained in Disk 15 (D1) are communicated back and forth with the database system 14, and sent via the disk mirroring system 20 to disk 19, (D2). The data files contained in disk D1 can be a "family" of disks, as opposed to just one disk. Therefore, if D1 contains a "family" of ten disks, the mirrored copy D2 must also contain a "family" snapshot of ten disks. Once the data files have been mirrored to D2 and QUIESCEED, then disk D2 can be used in place of D1 (RDBDISK). Therefore, if the disk D1 (RDBDISK) is flushed and goes offline, a mirrored copy is readily available in disk D2. The audit files within disk 16, (A1) are communicated back and forth with the database system 14. Also within the disk subsystem 22, there exist two spare disks 17 and 18, which could be suitably used to hold copies of the database 19 (D2). The spares 17 and 18 can also be brought online to increase the size of disk D1, and store non-related databases, and storage of application files.

Figure 4:
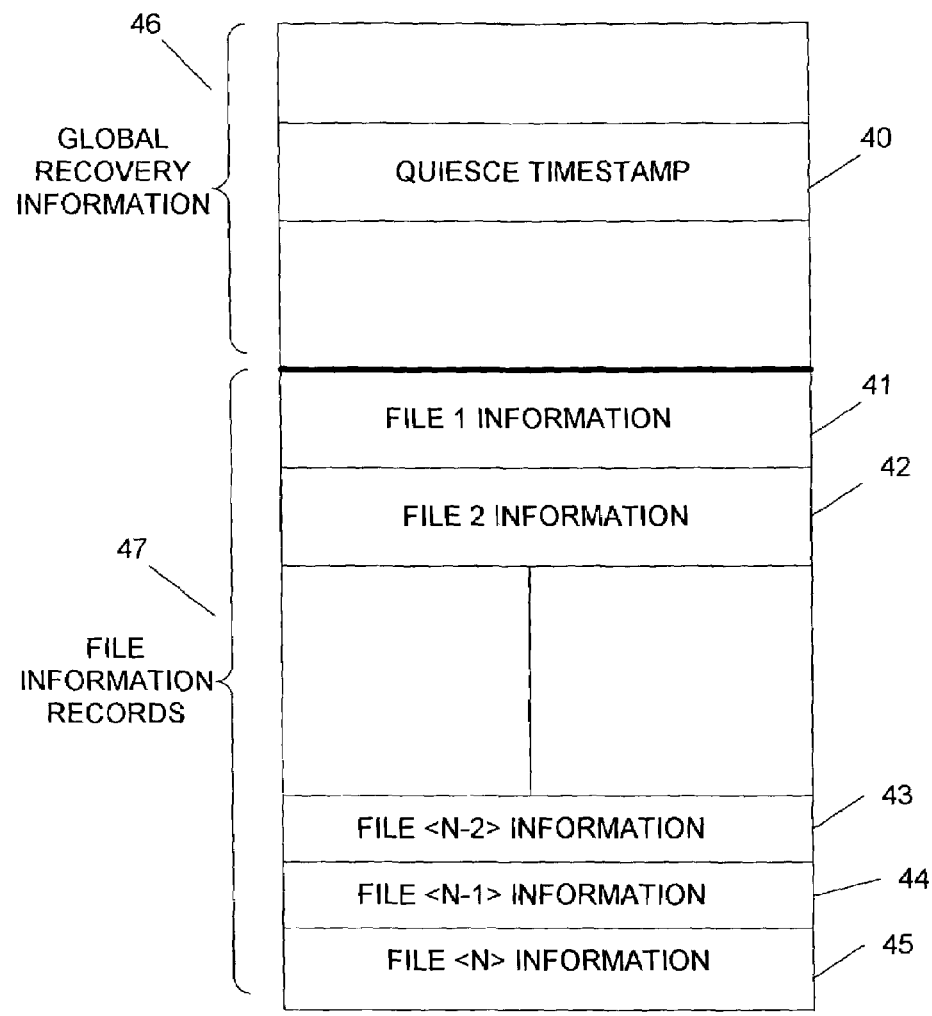
FIG. 4 is a schematic drawing of the REBUILDINFO file, which is the interface between the DMUTILITY and DMRECOVERY programs.

FIG. 4 is a schematic drawing of the REBUILDINFO file 31, which is the interface (in FIG. 3) between DMUTILITY 30 and DMRECOVERY 32. This consists of Global Recovery Information section 46, which includes the QUIESCE Time Stamp 40. Another section shows the system file information records 47, where information on specific files exists. For example, information on File 1 exists at 41 and information on a File 2 exists at 42, information on file <N–2> exists at 43, information on file <N–1> exists at 44, and information on File <N> exists at 45. There can exist any number of specific file information units within the file information records. File information could include the record number, file name, and family name (i.e. RDBDISK), Time Stamp creation, and much more. Therefore, File <N> information is simply referred to as "N" because it is the last file information within the record, and file <N–1> is the second to last file information within the record, and so on.

Described herein has been a method for rapid recovery of a failed main active database, which is continuously mirrored to an auxiliary database. Upon failure, the recovery programs work to rebuild the auxiliary database by transferring the primary audit files to update the auxiliary database to make it available for access almost immediately.

The present invention has been shown in one preferred embodiment and yet may still be implemented in other fashions, but still is to be interpreted in accordance with the attached claims.

What is claimed is:

1. In a single host server which operates under a Master Control Program (MCP), said single host server holding a normally active database means having a data disk file means (D1) which is mirrored to an auxiliary database means having an auxiliary data disk file means (D2), a method for establishing recovery operations upon failure of said active database means comprising the steps of:
   (a) utilizing a DMUTILITY program to QUIESCE said active database means (D1) and to transfer its data, at a Time Stamp starting point, over to said auxiliary database means (D2) wherein step (a) includes the step of:
      (a1) setting up a REBUILDINFO file to store starting time and ending condition Time Stamps plus multiple information files to supply file locations and relevant Time Stamps;
   (b) utilizing said Time Stamp starting point to initiate an audit file disk means to update said auxiliary database means (D2);
   (c) making said auxiliary database means (D2) immediately available for access by user applications.

2. In a single host server operating system under a Master Control Program (MCP) and holding an online active database means having a data disk file means (D1) which is mirrored to an auxiliary database means having an auxiliary data disk file means (D2), a method upon failure of said online active database means for Database recovery utilizing a mirrored snapshot of said online database means wherein said online database means (D1) services a plurality of User-applications, and is mirrored to an auxiliary database means (D2), said method comprising the steps of:
   (a) bringing online for Application-Users, a mirrored snapshot set of files on said auxiliary data disk file means disk (D2) which replicates said data disk means (D1);
   (b) utilizing a DMUTILITY REBUILD program, initiated by a QUIESCE database command, to select that portion of said data disk file means (D1) which needs to be recovered and the logical stopping point of the recovery;
   (c) verifying that said auxiliary data disk file means (D2) now has all data files resident in it which were originally on said data disk means (D1) at the time of the beginning Time Stamp;
   (d) storing, by said DMUTILITY program, of a QUIESCE Time Stamp in a REBUILDINFO file to indicate when said data disk means (D1) was taken off-line to enable it to transfer (REBUILD) its data to said auxiliary data disk means (D2);
   (e) reading of data changes in said audit trail file (A1) to make updating changes to said auxiliary data disk means (D2);
   (f) transmitting of all data from said data disk file means (D1) and audit trail images in said audit trail file (A1) onto said auxiliary data disk file means (D2);
   (g) enabling said updated auxiliary data disk file means to operate as an active database.

3. In a single host server operating under a Master Control Program (MCP) and holding an online active data disk file (D1) with an audit disk file (A1) and holding an auxiliary data disk file (D2) which is mirrored to said active data disk file (D1), a system for rapid database recovery during failure of said online active database disk (D1) comprising:
   (a) database system means holding said online active database disk (D1) and an audit file disk (A1);
   (b) disk mirroring connecting means whereby said online active database disk (D1) is replicated at an auxiliary database disk (D2);
   (c) means, using a Database Utility program, to initiate a QUIESCE command to momentarily QUIESCE said active database disk (D1) to start a recovery action and store a QUIESCE Time Stamp in a REBUILDINFO file;
   (d) means to transfer said files on said database disk (D1), at the Time Stamp point of QUIESCE, to said auxiliary database disk (D2);
   (e) means to update the data files on said auxiliary database disk (D2) with the audit trail on said audit file disk (A1) starting with the Time Stamp point of said QUIESCE; said means to update including:
      (e1) means to utilize said REBUILDINFO file to access said QUIESCE Time Stamp indicating the point in time to begin audit image application from audit disk (A1) to auxiliary data disk (D2);
      (e2) means to scan the audit file in disk (A1) backwards to locate the starting point Time Stamp;
      (e3) means to store in said REBUILDINFO file a Time Stamp value at which the application of audit images will terminate;
   (f) means to enable said auxiliary data disk file (D1) as an online database.

* * * * *